Feb. 3, 1948.                G. V. WOODLING                2,435,261
                              COUPLING DEVICE
                            Filed June 3, 1944

INVENTOR.
George V. Woodling.
BY

Patented Feb. 3, 1948

2,435,261

UNITED STATES PATENT OFFICE 2,435,261

COUPLING DEVICE

George V. Woodling, Cleveland, Ohio

Application June 3, 1944, Serial No. 538,665

2 Claims. (Cl. 285—86)

1

My invention relates in general to connecting devices and more particularly to connecting devices for tube fittings.

The invention is not limited to tube fittings, but includes any application where a substantially round element is connected to another element.

An object of my invention is the provision of connecting a substantially round element or tube to a coupling element by employing contractible means for annularly engaging the outer surface of the round element or tube.

Another object of my invention is the provision of anchoring or connecting a tube to a coupling element whereby the vibration of the tube is absorbed.

Another object of my invention is the provision of compressible or contractible means for engaging the tube at a point or place remote from the flared end of the tube which is pressed against the abutting end of the coupling element, whereby vibrations or shocks subjected to the tube are not carried over to the flared end of the tube.

Another object of my invention is the provision of the contractible means which not only engages the tube but which also functions as an element for pressing the flared end of the tube against the abutting end surface of the coupling element.

Another object of my invention is to control the amount of the contractible movement of the contractible means which engages the tube.

Another object of my invention is to prevent the parts from being assembled in the wrong way.

Other objects and a fuller understanding of my invention may be had by referring to the following description and claims, taken in conjunction with the accompanying drawing, in which:

Figure 1:
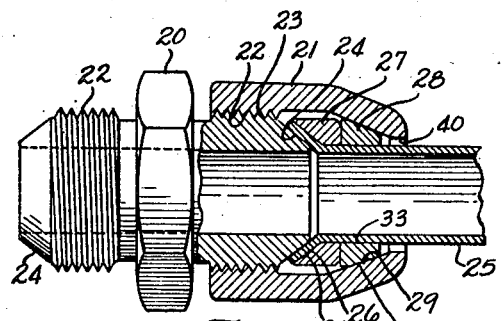
Figure 1 is a longitudinal cross-sectional view of a tube fitting embodying the features of my invention.

With reference to Figure 1 of the drawing, my invention is shown as being applied to a tube

Figures 2, 3:
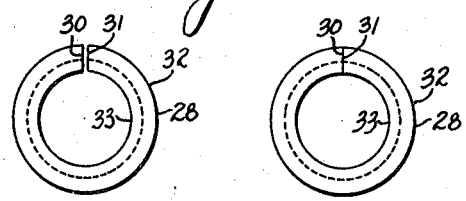
Figure 2 is a front view of the split collar or contractible means of my invention, shown in the un-contractible position.
Figure 3 is a view similar to Figure 2, showing the split collar or contractible means in the contractible position.

2 fitting comprising a coupling element 20, a tube 25 adapted to be connected thereto, and a compression nut 21. The right-hand end of the coupling element 20 is provided with a beveled abutment end 24 against which a flared end 26 of the tube is tightly pressed by means of a solid collar 27 which surrounds the tube. The compression nut 21 has an internal conical surface 29 spaced from the tube and defines in combination with the tube an annular tapering space to which is mounted a split conical collar or contractible means 28. The split collar 28 closely fits within the annular tapering space with its inner cylindrical surface 33 engaging the tube and with the outer conical surface 32 engaging the internal conical surface 29 of the compression nut. The solid collar 27 has upon the left-hand side thereof an internal conical surface 34 to engage the flared end of the tube and has upon the other side thereof a flat surface against which the split collar 28 exerts a force. The Figure 2 shows the split collar 28 and is provided with two open ends 30 and 31.

As the female threads 23 of the compression nuts are screwed upon the male threads 22 of the coupling element, the internal conical surface 29 of the compression nut engages the outer conical surface 32 of the split collar 28 and gradually causes the split collar 28 to contract as a contractible unit about the tube 25. As the compression nut 21 is turned on tighter, the split collar 28 continues to contract until the two ends 30 and 31 come together, at which point the washers become substantially solid, see Figure 3. Consequently, further tightening of the compression nut 21 on the coupling element 20 causes the split collar 28 to function as a solid unit for pressing the solid collar 27 against the flared end 26 of the tube for making a good seal between the flared end 26 of the tube and the beveled abutment end 24 of the coupling element 20. Th split collar 28 engages the tube at a place remote from the flared end and thereby absorbs vibration and fluid shocks, relieving the flared end 26 of the tube from such shock and vibration which would otherwise be damaging. It is to be observed that the split collar 28 contracts a limited amount until the open ends 30 and 31 come together for engaging the tube, after which the split collar becomes substantially solid for pressing the solid collar 27 against the flared end of the tube.

The split collar 28 is free to contract and is not opposed in its contractible movement by the solid collar 27. In my invention, positive assurance is guaranteed that the tube will be compressed by the split collar 28 to absorb vibration and fluid shocks, because the split collar 28 must close before pressure is applied to the solid collar 27 to press the flared end of the tube against the beveled abutment end 24. The space between the two open ends 30 and 31 controls the amount of the contractible movement and in actual practice may be such as to compress the tube a few thousandths of an inch to give a good firm grip to absorb vibrations and fluid shocks. The solid collar 27, since it is solid as distinguished from being split, makes a continuous pressure area against the flared end 26 of the tube and insures a good sealing engagement.

Figure 4:
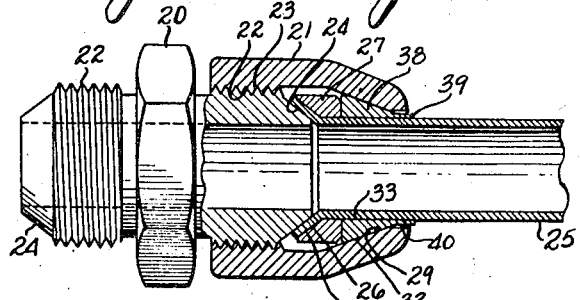
Figure 4 is a longitudinal cross-sectional view of my invention with a modified split collar having a rear end extension.

In Figure 4 I show a modified split collar which is designated by the reference character 38, and has a rearwardly extending portion 39 which passes through the opening 40 in the compression nut 21. The rearwardly extending portion 39 may serve as an indication that the open ends 30 and 31 have closed together as the compression nut 21 is screwed tight. The portion 39 gives additional length to the split collar to engage the tube, and further the pressure of the engagement may gradually taper off as the remote end of the portion 39 is approached.

Figure 5:
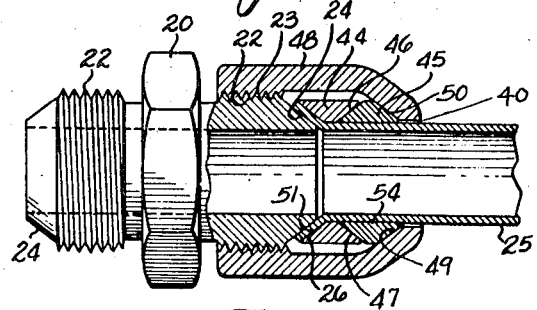
Figure 5 is a longitudinal cross-sectional view of my invention with modified solid and split collars.
Figure 6:
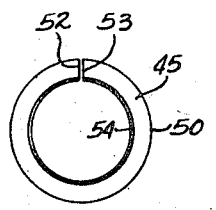
Figure 6 is a front view of the split collar in Figure 4.

In Figure 5 I show both a modified solid collar and a split collar. The modified solid collar is designated by the reference character 44 and the split collar by the reference character 45. As illustrated, the split collar 45 is provided with a forward tapered male end 46 which fits into a rearward tapered female end 47 of the solid collar 44. As the compression nut 48 is screwed on tight, the split collar 45 is compressed not only by the internal conical surface 49 of the nut engaging the outer conical surface 50 thereof, but also by the forward tapered male end 46 being forced into the rearward tapered female end 47.

When the compression nut 48 is screwed on tight and the two ends 52 and 53 have come together, the split collar 45 presses against the solid collar 44 and causes the forward beveled end 51 of the solid collar to press against the flared end 26 of the tube 25 and thereby make a good sealing engagement between the flared end of the tube and the beveled abutment end 34 of the coupling element 20. The angles of the surfaces 46, 47, 50 and 51 of the solid and split collars, and the internal conical surface 49 of the compression nut 48, are substantially the same as the angle of the flared end 26 of the tube, so that there is no possibility of the solid and split collars 44 and 45 being assembled wrongly. That is to say, the solid and split collars 44 and 45 form substantially isosceles triangles and each is substantially symmetrical with respect to a center line passing radially therethrough. When the two ends 52 and 53 of the split collar 45 are pressed together, the inner cylindrical surface 54 of the split collar 45 is compressed about the tube 25 to absorb vibration and fluid shock. It is to be observed that the base of the triangular cross-section of the split collar 45 and the apex of the triangular cross-section of the solid collar 44 engage the tube 25, with the result that the compression engagement of the split collar upon the tube is relatively long to absorb vibrations and fluid shock even though the compression nut 48 is relatively short. All of the forms of my invention may be used for making bends close to the coupling element, since the overall length is relatively short. The opening 40 in the compression nut may be of any dimension whereby the compression nut may be slid along the tube away from the coupling element even though the tube may be bent at an angle substantially right angle to the axis of the coupling element. In all the forms of the invention shown in the drawing, the space between the two open ends of the split collar controls the amount of the contractible movement and the degree that the split collar compresses the tube inwardly to give a good grip for absorbing vibrations and fluid shock.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device for attaching a tube having a flared end to a fitting element having an abutting end surface against which the flared end of the tube engages, said device comprising a hollow member adapted to fit around the tube and having means to engage the fitting element for securing said member to said fitting element, a solid collar in the hollow member adapted to surround the tube and disposed next adjacent to the flared end of the tube, said solid collar having reversible and substantially identical end surfaces, each constituting substantially an internal cam surface with one of said cam surfaces engaging the flared end of the tube, a split collar in the hollow member disposed to engage the solid collar and adapted to be contracted about the tube at a place remote from the flared end of the tube, said split collar having reversible and substantially identical end surfaces, each constituting substantially an external cam surface with one of said external cam surfaces engaging the internal cam surface on the solid collar which is remote from the flared end of the tube, said hollow member having substantially an internal cam surface for engaging the other of the said external cam surfaces of the split collar and forcing the split collar against the solid collar, whereby the split collar is forcibly contracted by cam pressure upon both ends thereof around the tube to clamp the tube against longitudinal movement in the hollow member, said split collar upon contraction pressing against the solid collar and forcing the said one end of said cam surfaces thereon tightly against the flared end of the tube, whereby the flared end of the tube is pressed tightly against the abutting end surface of the fitting element for making a sealing engagement therebetween.

2. A device for attaching a tube to a fitting element having an abutting end surface, said device comprising a hollow member adapted to fit around the tube and having means to engage the fitting element for securing said member to said fitting element, a solid collar in the hollow member adapted to surround the tube and disposed to be longitudinally arrested relative to the abutting end surface of the fitting element, said solid collar having reversible and substantially identical end surfaces, each constituting substantially an internal cam surface with one of said cam surfaces facing the abutting end surface of the fitting element and transmitting forces thereto, a split collar in the hollow member disposed to engage the solid collar and adapted to be contracted about the tube at a place remote from the end of the tube, said split collar having reversible and substantially identical end surfaces, each constituting substantially an external cam surface with one of said external cam surfaces engaging the internal cam surface on the solid collar which is remote from the abutting end surface of the fitting element, said hollow member having substantially an internal cam surface for engaging the other of the said external cam surfaces of the split collar and forcing the split collar against the solid collar, whereby the split collar is forcibly contracted by cam pressure upon both ends thereof around the tube to clamp the tube against longitudinal movement in the hollow member, said split collar upon contraction pressing against the solid collar and forcing the said one end of said cam surfaces thereon toward the abutting end surface of the fitting element for making a sealing engagement between the solid collar and the abutting end surface of the fitting element.

GEORGE V. WOODLING.

REFERENCES CITED

The following references are of record in the file of this patent:

UNITED STATES PATENTS

| Number | Name | Date |
|---|---|---|
| 2,320,813 | Cowles | June 1, 1943 |
| 2,320,812 | Cowles | June 1, 1943 |
| 406,060 | Potts | July 2, 1889 |
| 2,112,239 | Guarnaschelli | Mar. 29, 1938 |
| 1,295,106 | Bowlzer | Feb. 25, 1919 |
| 2,333,470 | Cowles | Nov. 2, 1943 |